Patented June 7, 1949

2,472,215

UNITED STATES PATENT OFFICE 2,472,215

DISAZO DYESTUFFS AND A PROCESS FOR THEIR MANUFACTURE

Hans Ischer, Basel, Switzerland, assignor to the firm Sandoz Ltd., Fribourg, Switzerland No Drawing. Application March 8, 1945, Serial No. 581,715. In Switzerland January 26, 1944

9 Claims. (Cl. 260—177)

The present invention relates to new disazo dyestuffs dyeing cellulosic fibres in red shades which, when after-coppered, possess excellent fastness properties to washing and to light, and to a process for their manufacture.

It has been found that new disazo dyestuffs can be obtained by coupling 1 mole of a tetrazotized 1-amino-4 - (4' - amino) - benzoylaminobenzene with 1 mole of a hydroxybenzoic acid and subsequently with 1 mole of 2-benzoylamino-5-hydroxynaphthalene - 7 - sulphonic acid in a slightly alkaline medium. The new dyestuffs are, in dry state, dark powders being soluble in water and in concentrated sulphuric acid with a red coloration and dyeing cotton and regenerated cellulosic fibres in red shades that become fast to washing and to light on after-treatment with copper salts.

The following example, without being limitative, illustrates the present invention, the parts being by weight.

Example 22.6 parts of 1-amino-4-(4'-amino)-benzoylamino-benzene are tetrazotized at 0°–10° C. with 55 parts of 30% hydrochloric acid and with 14 parts of sodium nitrite and coupled at 0° C., in the presence of the calculated quantity of sodium bicarbonate, with 14 parts of salicylic acid. The yellow-brown diazoazo compound thus precipitated is then treated at 0°–5° C with a neutral solution of 35 parts of the sodium salt of 2-benzoylamino-5-hydroxynaphthalene - 7 - sulphonic acid in 250 parts of water and the whole stirred, until the coupling is finished. The formation of the dyestuff is preferably carried out in a medium containing sodium bicarbonate in order to avoid any coupling in para-position to the hydroxygroup.

The dyestuff thus produced precipitates during its formation and is filtered and dried. It is a dark powder being soluble in water and in concentrated sulphuric acid with a red coloration and dyeing cotton as well as regenerated cellulosic fibres in red shades which become fast to washing and to light on after-treatment with copper salts.

By using, instead of salicylic acid, for instance 2-hydroxy-3-methylbenzene-1-carboxylic acid or 2-hydroxy - 4 - methylbenzene-1-carboxylic acid, disazo dyestuffs possessing similar properties to those of the above said dyestuff will be obtained.

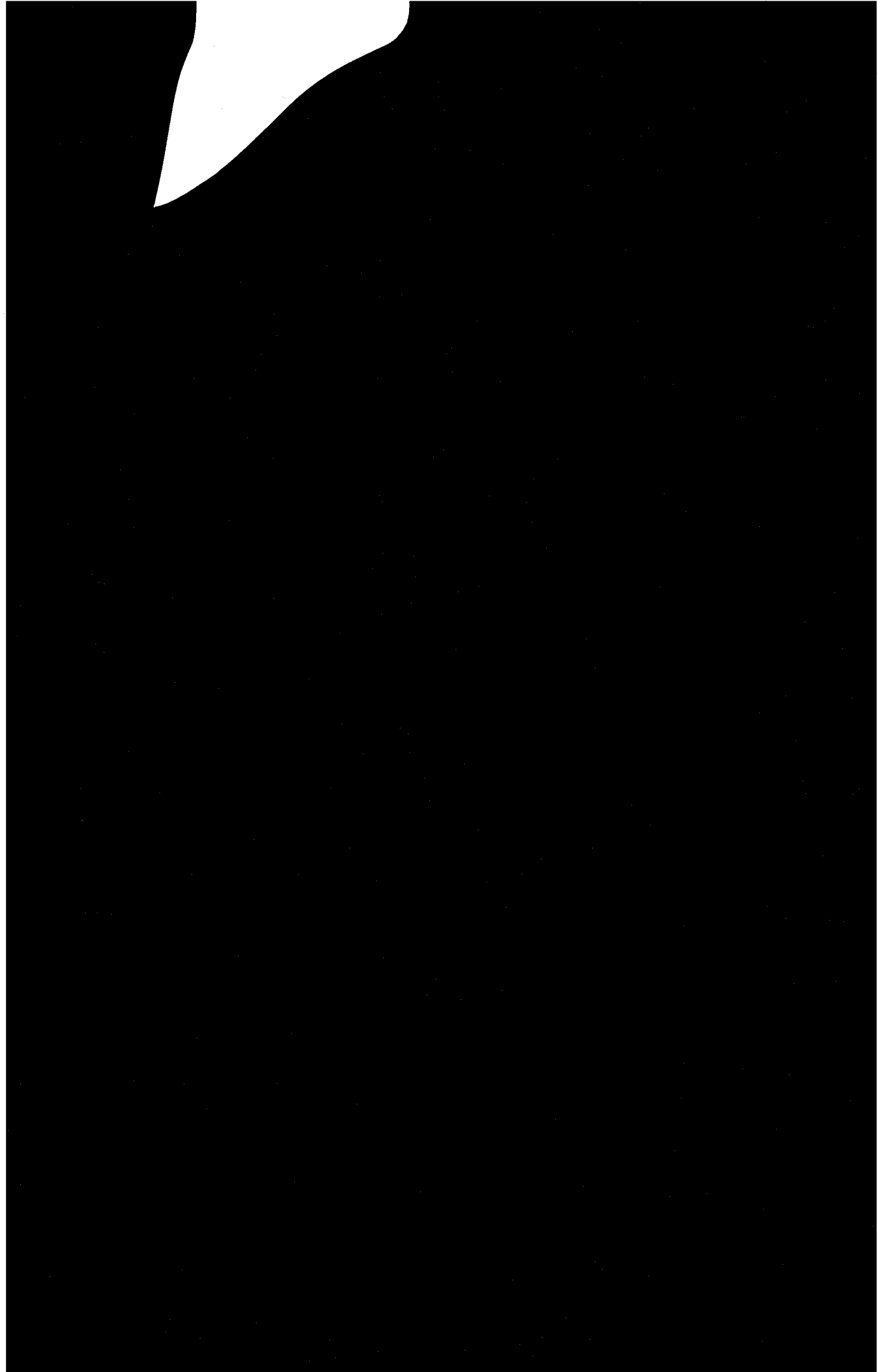

What I claim is:

1. The process for the manufacture of new disazo dyestuffs comprising the step of coupling 1 mole of tetrazotized 1-amino-4-(4'-amino)-benzoylaminobenzene with 1 mole of a hydroxybenzoic acid of the formula

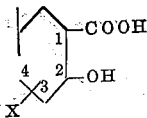

wherein X is in one of the positions 3 and 4 and stands for a member selected from the group consisting of hydrogen and methyl, and with 1 mole of 2-benzoylamino-5-hydroxynaphthalene-7-sulphonic acid in a slightly alkaline medium.

2. The process for the manufacture of a new disazo dyestuff comprising the step of coupling 1 mole of tetrazotized 1-amino-4-(4'-amino)-benzoylamino-benzene with 1 mole of salicylic acid and with 1 mole of 2-benzoylamino-5-hydroxynaphthalene-7-sulphonic acid in a slightly alkaline medium.

3. The process for the manufacture of a new disazo dyestuff comprising the step of coupling 1 mole of tetrazotized 1-amino-4-(4'-amino)-benzoylamino-benzene with 1 mole of 2-hydroxy-3-methylbenzene-1-carboxylic acid and with 1 mole of 2-benzoylamino-5-hydroxynaphthalene-7-sulphonic acid in a slightly alkaline medium.

4. The process for the manufacture of a new disazo dyestuff comprising the step of coupling 1 mole of tetrazotized 1-amino-4-(4'-amino)-benzoylamino-benzene with 1 mole of 2-hydroxy-4-methylbenzene-1-carboxylic acid and 1 mole of 2-benzoylamino-5-hydroxynaphthalene-7-sulphonic acid in a slightly alkaline medium.

5. A disazo dyestuff of the formula

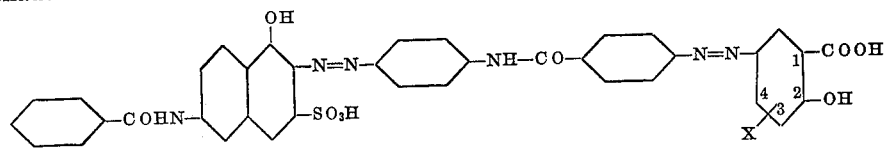

wherein X is in one of the positions 3 and 4 and stands for a member selected from the group consisting of hydrogen and methyl, which dyestuff dyes cotton and regenerated cellulosic fibres